United States Patent [19]
Kinoshita et al.

[11] Patent Number: 5,504,638
[45] Date of Patent: Apr. 2, 1996

[54] DEVICE FOR DRIVING DISK-TYPE STORAGE MEDIUM WITH IMPROVED CLAMP AND HUB ARRANGEMENT

[75] Inventors: Yoshihiko Kinoshita, Hiratsuka; Hiroshi Nishida, Kanagawa; Tatsuya Ishigaki, Yokohama; Kenziro Kai, Chigasaki; Koichi Ono, Hiratsuka, all of Japan

[73] Assignee: Hitachi, Ltd., Tokyo, Japan

[21] Appl. No.: 143,222

[22] Filed: Oct. 26, 1993

[30] Foreign Application Priority Data

Oct. 27, 1992 [JP] Japan ................... 4-288909

[51] Int. Cl.⁶ .................................................. G11B 17/08
[52] U.S. Cl. .................................... 360/98.08; 360/99.12
[58] Field of Search ......................... 360/99.12, 98.08

[56] References Cited

U.S. PATENT DOCUMENTS

| | | | |
|---|---|---|---|
| 4,224,648 | 9/1980 | Roling | 360/99.12 |
| 4,713,703 | 12/1987 | Asano | 360/99.12 |
| 4,875,118 | 10/1989 | Kaymaram | 360/99.12 |
| 4,910,620 | 3/1990 | Olbrich | 360/99.12 |
| 4,918,545 | 4/1990 | Scheffel | 360/99.12 |
| 4,945,432 | 7/1990 | Matsudaira et al. | 360/98.02 |
| 5,243,481 | 9/1993 | Dunckley et al. | 360/99.12 |
| 5,315,463 | 5/1994 | Dew et al. | 360/99.12 |

FOREIGN PATENT DOCUMENTS 258781A 2/1990 Japan .

Primary Examiner—A. J. Heinz
Attorney, Agent, or Firm—Kenyon & Kenyon

[57] ABSTRACT

A disk drive for driving storage disks can suppress warping of the disks even when thinner disks and a less rigid hub are employed for the purpose of reducing the size of the disk drive. The disk drive includes a plurality of disk-type storage media, spacers placed between respective two adjacent disk-type storage media, a hub on which a stack of the disk-type storage media and the spacers is fitted, the hub having a surface contacted by the disk-type storage medium positioned on one end of the stack, and a clamp which presses the stack onto the surface of the hub.

8 Claims, 7 Drawing Sheets

DEVICE FOR DRIVING DISK-TYPE STORAGE MEDIUM WITH IMPROVED CLAMP AND HUB ARRANGEMENT

BACKGROUND OF THE INVENTION

1. Field of the Invention

The present invention relates to a disk-type storage medium and, more particularly, to a driving device generally referred to as disk drive, suitable for driving magnetic disks which are used as storage media in a magnetic-disk-type storage apparatus.

2. Description of the Related Arts

A typical known disk drive used in a magnetic-disk-type storage device employs a hub and a clamp which cooperate with each other in clamping a stack of disks therebetween. More specifically, a plurality of disks and spacers are stacked alternately on the hub, and the outer peripheral region of the clamp presses the disks and spacers in a stacking direction thereby fixing the disks and spacers to the hub.

In recent years, there is a trend towards reduced size and enhanced storage capacity of magnetic-disk-type storage apparatus. In fact, 5-inch disks which were the dominant storage apparatus have already been replaced by 3.5-inch disks and, nowadays, smaller and thinner disks, e.g., 2.5-inch disks, are becoming popular. Meanwhile, storage capacity of storage apparatuses employing, for example, 3.5-inch disks has been increased from 200 megabytes to 400 megabytes and further to 1 gigabytes. Thus, disk drives have to be designed and constructed in conformity with the above-mentioned trend towards reduction in the size of apparatus and enhancement of the storage capacity. When enhancement of storage capacity is achieved by increasing the number of the disks, the disk drive is required to have a reduced thickness to reduce the overall height of the apparatus.

As stated before, a conventional magnetic disk drive has a hub and a clamp which cooperate with each other in clamping therebetween a stack of disks and spacers arranged alternately, the clamp at its outer peripheral region pressing the stack in the stacking direction thereby fixing the disks and spacers to the hub. In this known structure, the disks tend to be warped or distorted in the radial direction because of deformation of the hub caused by the pressing force exerted by the clamp, even though the force of the clamp is applied uniformly. This problem is serious, particularly in small-sized apparatuses which employ hubs of smaller rigidity, as well as spindle motors of smaller size.

FIG. 11 illustrates an example of a known disk drive which incorporates an in-hub type spindle motor. The spindle motor has a hub A which is held by bearings D, E secured to a shaft C on a bracket B. A rotor hub F fits on the hub A and the shaft C. A stator G, which is provided at its portion inside the hub with a coil, is secured to the shaft C. A magnet rotor H is attached to the inner surface of the hub. Disks I–K and spacers L –M are alternately stacked and fitted on the hub A, and are pressed towards and against a flange O of the hub by means of a clamp N which is screwed to the hub A.

The clamp N screwed to the hub A produces a force which acts, as shown in FIG. 12, in such a manner as to radially outwardly spread the flange O, causing elastic deformation of the hub A. Consequently, the disks I–K and spacers L–M are displaced, with the result that some or whole of the disks are warped depending on factors such as the thickness of the disk, number of spacers and rigidity of the hub. For instance, when the hub has a reduced mechanical strength due to requirement for reduction in the size of the apparatus, the point or area of contact between the disk I and the spacer M is located radially outside the point or area of contact between the disk I and the hub A. As a consequence, a bending moment $M_1$ is generated to act about a fulcrum presented by the point or area of contact between the disk I and the spacer M, due to restoration force exerted by the hub, with the result that the disk I is distorted so as to convex towards the flange O or the bracket B. Alternately, the contact between the disk K and the clamp N takes place at a point or over an area which is on the radially inner side of the point or area of contact between the disk K and the spacer L, so that a bending moment $M_2$ is generated about a fulcrum presented by the point or area of contact between the disk K and the spacer L, due to restoration force of the hub. In such a case, the disk K is warped to convex towards the clamp N.

Increase in the storage capacity of the apparatus requires not only increased density of recording of data in the disk but also enhanced resolution of recording. To this end, it is necessary to reduce the amount of lift of the magnetic head. Since the data area exists on a radially inner part of the disk, the warp of the disk at the data area is more critical in small-sized disks than in large-size disks. Consequently, a significant difference is caused in the amount of lift between the obverse side and reverse side of the disk, which in turn causes a large difference in read-out voltage, thus impairing read-out precision.

FIG. 13 illustrates a relationship between the amount of lift of a head associated with the disk adjacent to the hub and the amount of lift of a center rail portion which constitutes a signal pick-up portion. Referring to this figure, a head facing the concave side of the warped disk 1 has a slider P which is provided with floating surfaces $P_1$ and $P_2$ and a center rail portion $P_3$ which constitutes the signal pick-up portion. A head facing the convex side of the warped disk 1 has a slider Q which is provided with floating surfaces $Q_1$ and $Q_2$ and a center rail portion $Q_3$ which constitutes the signal pick-up portion. When the disk 1 has been warped as illustrated, the amount hg1 of lift of the center rail portion $P_3$ tends to increase, even when the amounts $h_{11}$ and $h_{21}$ of lifts of the floating surfaces $P_1$ and $P_2$ are maintained stably. Conversely, in case of the head facing the convex side of the disk 1, the amount $hg_2$ of lift of the center rail portion $Q_3$ tends to decrease, even when the amounts $h_{12}$ and $h_{22}$ of lifts of the floating surfaces $Q_1$ and $Q_2$ are maintained stably. Consequently, a large difference is developed in the read-out voltage between the head facing the concave side of the disk 1 and the head facing the convex side of the same. In particular, read-out precision is liable to be impaired on the slider P facing the concave side of the disk due to reduced read-out voltage, because the amount $hg_2$ of lift of the center rail portion exceeds the design value.

Japanese Patent Unexamined Publication No. 2-58781 discloses a magnetic-disk-type storage apparatus in which spacers between disks of a stack are made of an elastic material so as to reduce distortion of disks which are caused by the pressure applied by the clamp. Practically, however, it is impossible to obtain spacers of an elastic material with a high degree of dimensional precision. The dimensions of the spacer of such elastic material largely changes according to factors such as temperature and clamping pressure, so that the dimensional precision of the spacers varies according to individual apparatus, resulting in variation in the lift amounts of the heads. It is therefore difficult to produce a magnetic-disk-type storage apparatus having a high read-out precision using such spacers.

SUMMARY OF THE INVENTION

The present invention provides a device for driving disk-type storage media of the type which comprises: a plurality of disk-type storage media; spacers placed between respective two adjacent disk-type storage media; a hub on which a stack of the disk-type storage media and the spacers is fitted, the hub having a surface contacted by the disk-type storage medium positioned on one end of the stack; and a clamp which presses the stack onto the surface of the hub; wherein the driving device is improved in such a manner as to suppress warping of the disk-type recording medium even when the size of the driving device is reduced.

In order to achieve this result according to one embodiment of the present invention, there is provided a device of the type mentioned above for driving disk-type recording media, wherein the hub has a protrusion provided on the surface thereof at a position which is at the radially outer side of the point or area where the disk-type storage medium adjacent to the hub contacts the spacer adjacent thereto when the clamp is mounted.

According to another embodiment of the present invention, there is provided a device of the type mentioned above for driving disk-type storage media, wherein the spacer adjacent to the disk-type storage medium adjacent to the hub has a protrusion formed on the surface thereof facing the disk-type storage medium at a position which is at the radially inner side of the point or area where the disk-shaped storage medium contacts the hub when the clamp is mounted.

According to still another embodiment of the present invention, there is provided a device of the type mentioned above for driving disk-type storage media, wherein the hub has a protrusion provided on the surface of the hub at a position which is at the radially outer side of the point or area where the disk-type storage medium adjacent to the hub contacts the spacer adjacent thereto when the clamp is mounted on the hub, and wherein the spacer adjacent to the disk-type storage medium adjacent to the hub has a protrusion formed on the surface thereof facing the disk-type storage medium at a position which is at the radially inner side of the point or area where the disk-shaped storage medium contacts the hub when the clamp is mounted.

According to a further embodiment of the present invention, there is provided a device of the type mentioned above for driving disk-type storage media, wherein the hub has a protrusion provided on the surface of the hub at a position which is at the radially outer side of the point or area where the disk-type storage medium adjacent to the hub contacts the spacer adjacent thereto when the clamp is mounted, and wherein each of plural spacers arranged successively starting from the spacer adjacent to the hub is provided with a protrusion on the surface thereof facing the disk-type storage medium adjacent to the hub at a position which is at the radially inner side of the protrusion on the hub.

According to a still further embodiment of the present invention, there is provided a device of the type mentioned above for driving disk-type storage media, wherein the spacer adjacent to the disk-type storage medium adjacent to the clamp has a protrusion formed on the surface thereof facing the disk-type storage medium at a position which is at the radially inner side of the point or area where the disk-shaped storage medium contacts the clamp when the clamp is mounted.

According to a still further embodiment of the present invention, there is provided a device of the type mentioned above for driving disk-type storage media, wherein each of plural spacers arranged successively starting from the spacer adjacent to the clamp towards the hub is provided with a protrusion on the surface thereof facing the disk-type storage medium adjacent to the clamp at a position which is at the radially inner side of the point or area where the clamp contacts the disk-type storage medium adjacent thereto when the clamp is mounted.

According to a still further embodiment of the present invention, there is provided a device of the type mentioned above for driving disk-type storage media, wherein the hub has a protrusion provided on the surface thereof at a position which is at the radially outer side of the point or area where the disk-type storage medium adjacent to the hub contacts the spacer adjacent thereto when the clamp is mounted on the hub, and wherein the spacer adjacent to the disk-type storage medium adjacent to the clamp has a protrusion on the surface thereof facing the disk-type storage medium adjacent to the hub at a position which is at the radially inner side of the point or area where the clamp contacts the disk-type storage medium adjacent thereto when the clamp is mounted.

According to a still further embodiment of the present invention, there is provided a device of the type mentioned above for driving disk-type storage media, wherein the hub has a protrusion provided on the surface thereof at a position which is at the radially outer side of the point or area where the disk-type storage medium adjacent to the hub contacts the spacer adjacent thereto when the clamp is mounted on the hub, wherein the spacer adjacent to the disk-type storage medium adjacent to the hub has a protrusion formed on the surface thereof facing the disk-type storage medium at a position which is at the radially inner side of the point or area where the disk-shaped storage medium contacts the hub when the clamp is mounted, and wherein the spacer adjacent to the disk-type storage medium adjacent to the clamp has a protrusion on the surface thereof facing the disk-shaped storage medium adjacent to the clamp at a position which is at the radially inner side of the point or area where the clamp contacts the disk-type storage medium adjacent thereto when the clamp is mounted.

According to a still further embodiment of the present invention, there is provided a device of the type mentioned above for driving a single disk-type storage medium, wherein the hub has a protrusion provided on the surface facing the disk-type storage medium at a position which is at the radially outer side of the point or area where the disk-type storage medium contacts the clamp when the clamp is mounted.

When a plurality of disk-type storage media are used, the number of the disk-type storage media which suffer from warping, as well as the extent of the warp, varies according to various factors such as the thickness of the disk-type storage medium, mechanical strength of the hub, and so forth. According to the present invention, a protrusion or protrusions are provided according to these factors, for example, only on the spacer adjacent to the disk which is adjacent to the hub, on the hub and the spacer adjacent to the hub, on the hub and a plural spacers arranged one on another starting from the spacer adjacent to the disk adjacent to the hub, only on the spacer which is adjacent to the disk adjacent to the clamp, on the spacer adjacent to the disk adjacent to the clamp and other spacers arranged towards the hub starting from this spacer, on the spacer adjacent to the disk adjacent to the hub and the spacer adjacent to the disk adjacent to the clamp, or on the hub and the spacer adjacent to the disk adjacent to the hub and the spacer adjacent to the clamp.

When the thickness and other dimensions of the driving device are reduced for the purpose of enabling an increase in the number of the disk-type storage media to attain a greater storage capacity, the disk-type storage medium adjacent to the hub tends to suffer from warping. In such a case, a protrusion is provided only on the spacer adjacent to the disk which is adjacent to the hub. Such a protrusion functions such that the pressing force from the hub acts on a point which is at the radially outer side of a fulcrum presented by the point or area where the disk adjacent to the hub contacts with the spacer adjacent thereto, so as to generate a counter moment which acts in the direction counter to the direction of a bending moment $M_1$ which tends to warp the disk adjacent to the hub. When warp occurs not only on the disk adjacent to the hub but also on plural disks which are arranged successively starting from this disk, protrusions are preferably formed on the hub, the spacer adjacent to the disk which is adjacent to the hub and plural spacers which are arranged successively starting from this spacer towards the clamp. Each of such protrusions serves such that the pressing force transmitted from the hub to each disk-type storage medium acts on a point which is on the radially inner side of a fulcrum presented by the point or area where the disk-type storage medium contacts with the adjacent spacer, thereby generating a counter moment which acts in the direction counter to the bending moment $M_1$ which acts to cause the warp of the disk-type storage medium, whereby warping of each disk-type storage medium is prevented.

When the disk-type storage medium adjacent to the clamp suffers from warping, the driving device preferably employs a protrusion only on the spacer adjacent to the disk which is adjacent to the clamp. The protrusion serves such that the pressing force transmitted from the hub acts on a point which is at the radially inner side of a fulcrum presented by the point or area of contact between the clamp and the disk-type storage medium adjacent thereto, thereby generating a counter moment which acts in the direction counter to the bending moment $M_2$ which acts to cause the warp of the disk-type storage medium adjacent to the clamp. When warping takes place not only on the disk-type storage medium adjacent to the clamp but also other disk-type storage media arranged successively starting from this disk-type storage medium, the driving device employs protrusions formed on the spacer adjacent to the disk which is adjacent to the clamp, as well as on successive spacers which are arranged towards the hub starting from this spacer. Each of such protrusions functions such that the pressing force from the hub acts on each disk-type storage medium at a position which is at the radially inner side of a fulcrum presented by the point or area where the clamp contacts with the disk-type storage medium adjacent thereto, thereby generating a counter moment which acts in the direction counter to the moment $M_2$ which causes warping of the disk-type storage medium, whereby the warping of the disk-type storage medium is prevented.

When warping takes place on each of the disk-type storage medium adjacent to the hub and the disk-type storage medium adjacent to the clamp, the driving device preferably employs a protrusion provided on the spacer adjacent to the disk which is adjacent to the hub and a protrusion provided on the spacer adjacent to the disk which is adjacent to the clamp. The protrusion provided on the spacer adjacent to the disk-type storage medium adjacent to the hub serves such that the pressing force from the hub acts on this disk-type storage medium at a position which is at the radially outer side of a fulcrum presented by the point or area where the disk adjacent to the hub contacts with the spacer adjacent thereto. The protrusion provided on the spacer adjacent to the disk-type storage medium adjacent to the clamp serves such that the pressing force transmitted from the hub to the disk-type storage medium adjacent to the clamp acts on a point which is at the radially inner side of a fulcrum presented by the point or area where the clamp contacts the disk-type storage medium adjacent thereto. Consequently, counter moments are generated to act in the directions counter to the bending moments $M_1$ and $M_2$ which act to cause warp of the disk-type storage mediums adjacent to the hub and the clamp, whereby warping of these disk-type storage media is avoided. The driving device also may be constructed so as to have protrusions on the hub and on the spacer adjacent to the disk which is adjacent to the clamp, as well as on the spacer adjacent to the disk which is adjacent to the hub, Such a construction further ensures generation of the counter moment which acts in the direction counter to the bending moment $M_1$.

The present invention also may be applied to such a type of driving device which supports and drives a one disk-type storage medium. In such a case, the driving device has a protrusion provided on the hub, the protrusion functioning such that the pressing force transmitted from the hub to the sole disk-type storage medium acts on the medium at a position which is at the radially outer side of a fulcrum presented by the point or area where the clamp contacts the disk-type storage medium, thereby generating a counter moment which resists the bending moment $M_2$ which acts to convex the disk-type storage medium towards the clamp, thereby preventing warping of the disk-type storage medium.

DESCRIPTION OF THE PREFERRED EMBODIMENTS

Figure 1:
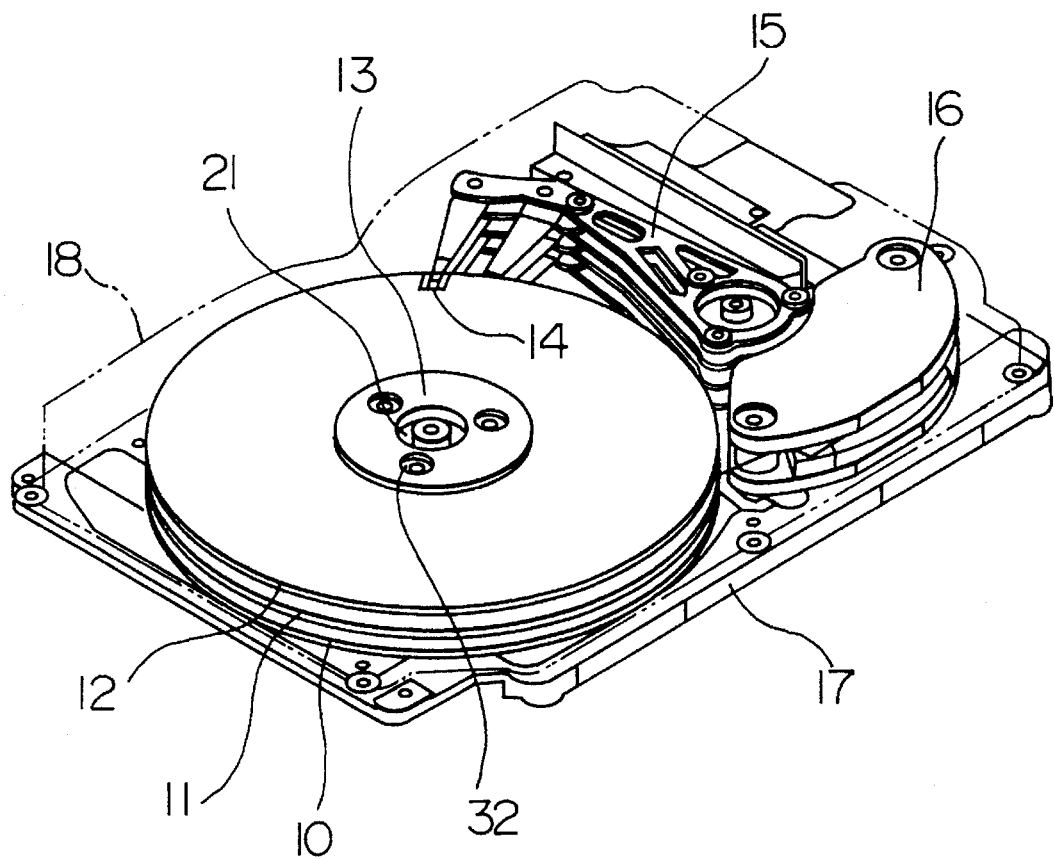
FIG. 1 is an illustration of the internal structure of a head-disk assembly of a magnetic-disk-type storage apparatus which incorporates a device embodying the present invention for driving disk-type storage media.

A disk drive is a device for supporting and rotationally driving disks as recording media in a magnetic-disk-type storage apparatus. FIG. 1 illustrates a disk drive device in a head-disk assembly of a magnetic-disk-type storage apparatus. The head-disk assembly has disks 10 to 12 as recording medium units, a spindle motor 13 for supporting and driving the disks, heads 14 for writing and reading data in and from the disks, a carriage actuator having head arms 15 for supporting the heads and a voice coil motor 16 for rotating the head arms, a base 17 which supports the spindle motor and the carriage actuator, and a cover 18 affixed to the base so as to cover and seal the above-mentioned components.

Figure 2:
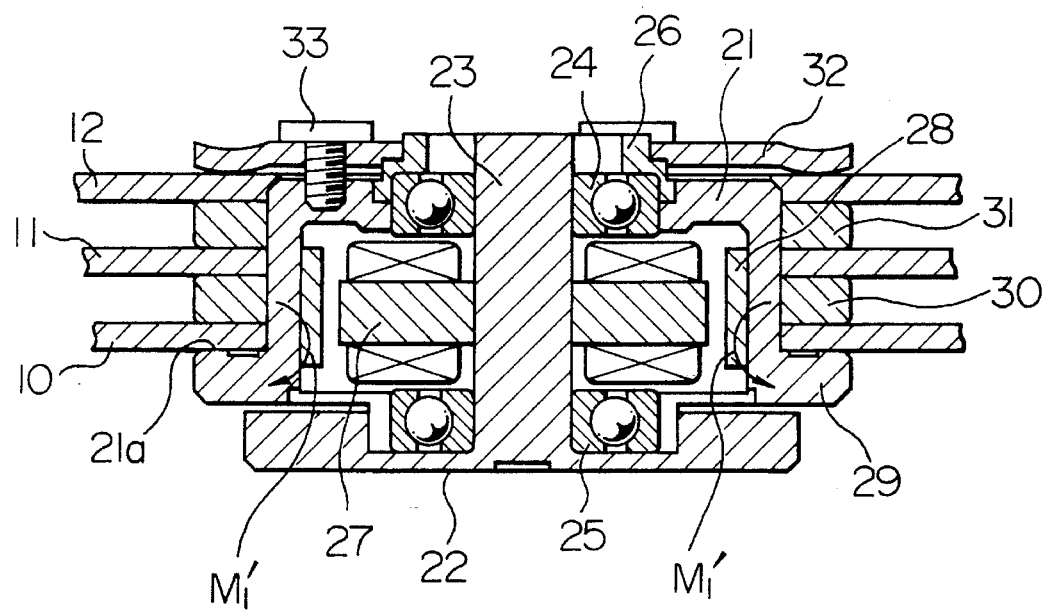
FIG. 2 is a sectional view of a first embodiment of the disk-type storage medium driving device in accordance with the present invention.

The spindle motor is of in-hub type which has, as shown in FIG. 2, a hub 21 and a bracket 22. The hub 21 is held by bearings 24, 25 secured to a shaft 23 formed integral with the bracket 22, so as to be rotatable on the shaft 23. A rotor hub 26 is fitted on the flange 29 of the hub and on the shaft 23. A stator 27 provided at its portion inside the hub with a coil attached to the shaft 23. A magnet rotor 28 is secured to the inner side of the hub 21 so that the hub 21 and the rotor magnet 28 are rotated together as the stator coil is energized.

The disk 10 directly contacts with the flange 29 of the hub 21. A disk 11 is held on the disk 10 with a spacer 30 placed therebetween, and a disk 12 is held on the disk 11 with a spacer 31 placed therebetween. These disks and spacers are fitted on the hub 21. A clamp 32 is fixed to the hub 21 by means of screws 33 so as to press the stack of the disks 10 to 12 and spacers 30, 31 towards the flange 29 of the hub, thereby fixing the stack onto the hub 21.

Referring now to FIG. 2, a first embodiment of the disk drive in accordance with the present invention has an annular protrusion 21a formed on the hub flange 29. The protrusion 21a is intended for preventing any warp of the disk which may otherwise be caused when the mechanical strength of the hub has been decreased due to miniaturization of the disk drive.

Figure 12:
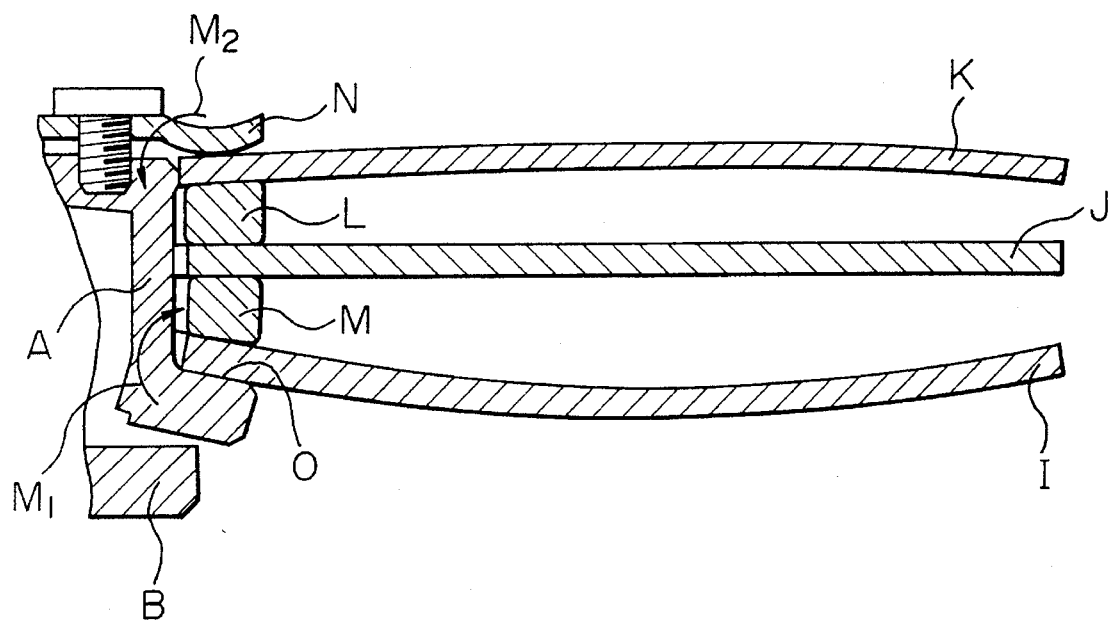
FIG. 12 is an illustration of the state of deformation in the conventional driving device.
Figure 13:
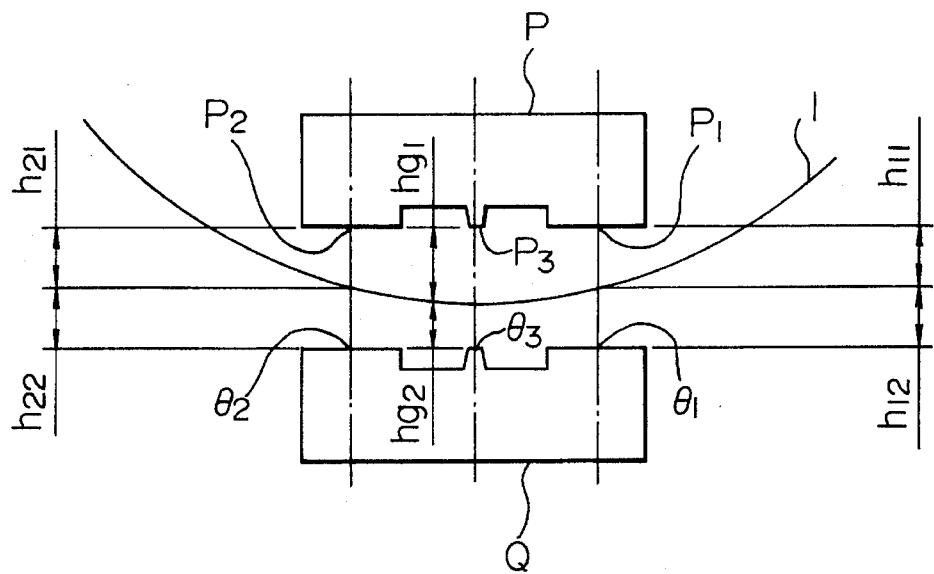
FIG. 13 is a chart illustrative of the relationship between the state of warp of a disk and amounts of lift of heads associated with the disk.

More specifically, the protrusion 21a is provided on the side of the hub flange 29 facing the disk 10 and is disposed at a position radially outside the point where the spacer 30 and the disk 10 contact each other when the clamp 32 is properly mounted on the hub 21. The remainder portion of the flange surface is flat, so that, when the clamp 32 has been mounted, the hub flange 29 contacts with the disk 10 only at the protrusion 21a, so as to produce a counter moment $M_1$, which resists the bending moment $M_1$ acting to warp the disk 10, thereby maintaining the disk 10 in flat condition. More specifically, as the clamp 21 is screwed to the hub 21, the hub 21 tends to be spread radially outward by the pressure exerted by the clamp 32 as explained before in connection with FIG. 12. Consequently, the elastic restoration force of the hub 21 is applied to the point of contact between the hub flange 29 and the disk 10, so that a bending moment $M_1$ is produced about a fulcrum constituted by the point of contact between the disk 10 and the spacer 30. This bending moment $M_1$ acts to warp the disk 10 towards the flange 29 or the bracket 22. In the illustrated embodiment, as a result of the presence of the protrusion 21a, the contact between the hub flange 29 and the disk 10 takes place at a position which is on the radially outer side of the point of contact between the spacer 30 and the disk 10, thus producing a counter moment $M_1'$ about a fulcrum constituted by the point of contact between the spacer 30 and the disk 10 so as to cancel the aforementioned bending moment $M_1$, thereby preventing the disk 10 from being warped.

Figure 3:
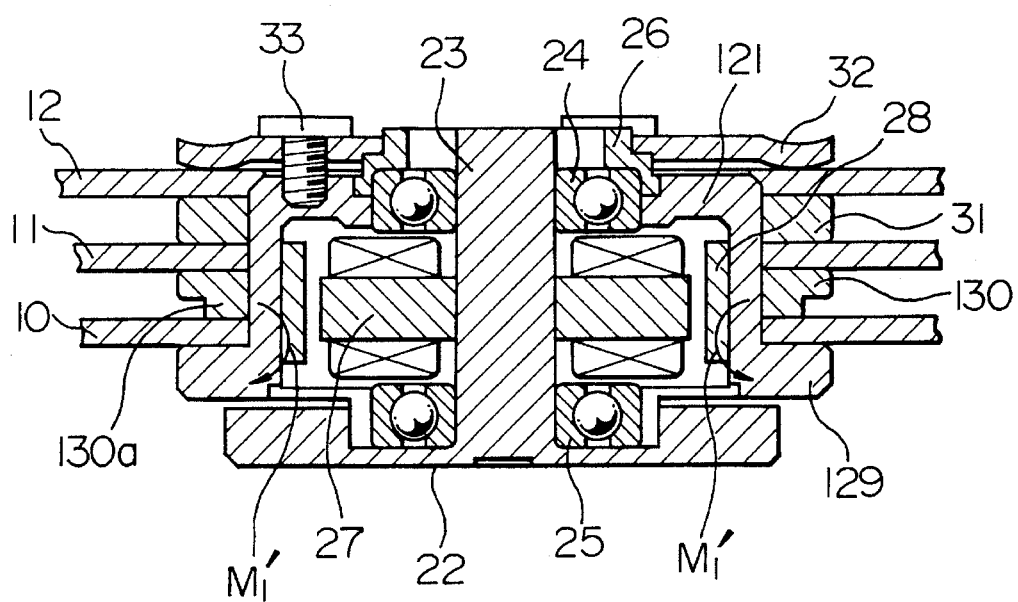
FIG. 3 is a sectional view of a second embodiment of the disk-type storage medium driving device in accordance with the present invention.

FIG. 3 illustrates a second embodiment of the disk drive for magnetic-disk-type recording apparatuses of the present invention. This disk drive has almost the same construction as that of the first embodiment described in connection with FIG. 2, but is distinguished from the first embodiment in that a flange 129 of a hub 121 does not have any protrusion but a spacer 130 alone has a protrusion 130a so as to produce a moment counter to the bending moment which tends to warp the disk 10.

More specifically, the second embodiment employs a hub 121 which has a construction similar to that of the hub 21 of the spindle motor shown in FIG. 2, but the surface of the flange 129 facing the disk 10 is flat, i.e., devoid of any protrusion. The spacer 130 is provided with a protrusion 130a only on its surface facing the disk 10 while the remainder area of this surface is flat, so that the spacer 130 makes contact with the disk 10 only at the protrusion 130a. The spacer 130 is different from the spacer 30 in the first embodiment in this connection. The protrusion 130a is disposed at a position which is on the radially inner side of the point of contact between the hub 121 and the disk 10 which takes place when the clamp 32 is mounted in the hub 21.

In this disk drive, as the clamp 32 is mounted on the hub 21, the hub flange 29 tends to be spread outward due to application of the pressing force exerted by the clamp 32, causing the pressing force exerted by the hub 121 to act on the point of contact between the hub 121 and the disk 10. Consequently, a bending moment $M_1$ is generated about a fulcrum constituted by the point of contact between the disk 10 and the spacer 130, tending to cause the disk 10 to convex towards the flange 129 of the hub or the bracket 22. In this embodiment, however, the point of contact between the hub 121 and the disk 10 is located on the radially outer side of the point of contact between the spacer 130 and the disk 10, due to the presence of the protrusion 130a, so that a counter moment $M_1'$ is produced to resist the bending moment $M_1$, thus preventing warping of the disk 10, as in the case of the first embodiment described in connection with FIG. 2.

Figure 4:
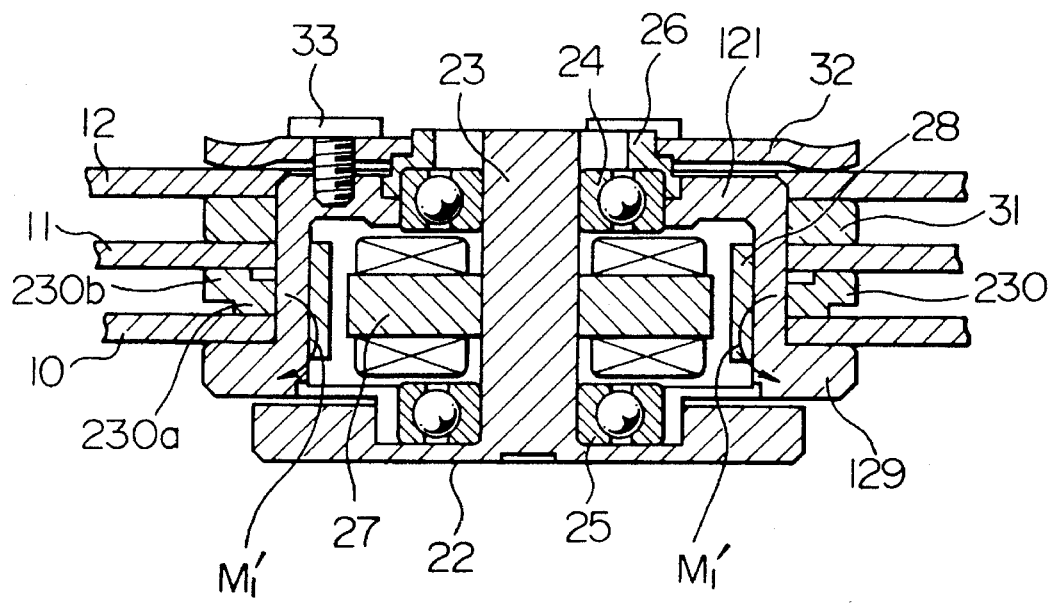
FIG. 4 is a sectional view of a third embodiment of the disk-type storage medium driving device in accordance with the present invention.

FIG. 4 illustrates a third embodiment of the disk drive of the invention for use in magnetic-disk-type storage apparatuses. The disk drive of the third embodiment has a construction similar to that of the second embodiment described in connection with FIG. 3. The third embodiment, however, is different from the second embodiment in that the spacer 230 placed between the disk 10 and the disk 11 has both a first protrusion 230a formed on the surface facing the disk 10 and a second protrusion 230b formed on the surface facing the disk 11. The second protrusion 230b effectively contributes to the generation of the counter moment $M_1'$ against the bending moment $M_1$ which tends to convex the disk 10 towards the flange 29.

Figure 5:
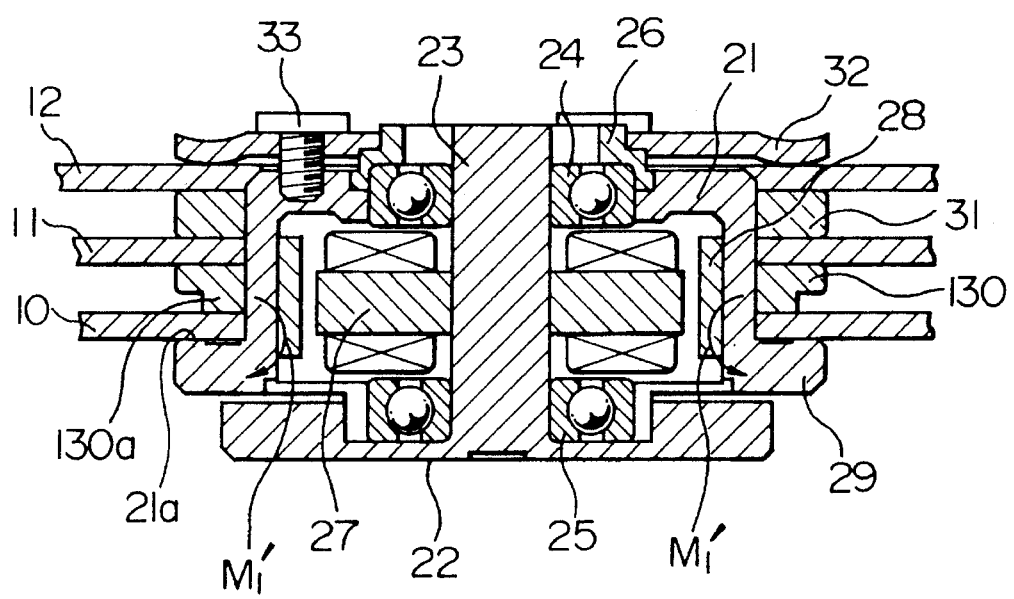
FIG. 5 is a sectional view of a fourth embodiment of the disk-type storage medium driving device in accordance with the present invention.

FIG. 5 shows a fourth embodiment of the disk drive of the invention for use in magnetic-disk-type storage apparatuses.

The fourth embodiment is similar to the first embodiment in that it has a protrusion 21a on the hub flange 29 but is different therefrom in that it has a protrusion 130a on the spacer 130 so as to ensure the generation of the counter moment $M_1$ which acts in the direction counter to that of the bending moment $M_1$.

As is the case of the hub of the spindle motor shown in FIG. 2, the flange 29 of the hub 21 has a protrusion 21a provided on the surface thereof facing the disk. The remainder part of this surface is flat so that the flange 29 of the hub contacts with the disk 10 only at the protrusion 21a thereof. The spacer 130 is provided on its surface facing the disk 10 with a protrusion 130a. The remainder area of this surface of the spacer 130, as well as the entire surface of the other side of the spacer 130, is flat. Thus, the spacer 130 makes contact with the disk 10 only at the protrusion 130a thereof. More specifically, the protrusion 21a is formed on the surface of the hub flange 29 facing the disk 10, at a position which is on the radially outer side of the point of contact between the clamp 32 and the disk 12 which takes place when the clamp 32 is mounted on the hub 21. The protrusion 130a is provided on the surface of the spacer 130 facing the disk 10, at a position which is on the radially inner side of the point of contact between the hub 21 and the disk 10 which takes place when the clamp 32 is mounted on the hub 21.

In this disk drive, as in the disk drive of the first embodiment described before in connection with FIG. 2, a pressing force from the hub 21 acts on the point of contact between the disk 10 and the spacer 130 as the clamp 32 is screwed to the hub 21, tending to generate a bending moment $M_1$ which would cause such a warp of the disk 10 as to convex towards the hub flange 29 or the bracket 22. In this embodiment, however, the protrusion 21a provided on the hub flange 29 serves to locate the point on which the pressing force from the hub 21 acts at a position which is on the radially outer side of the point of contact between the disk 10 and the spacer 130, thus generating a bending moment $M_1'$ which acts in the direction counter to the aforementioned bending moment $M_1$, while the protrusion 130a of the spacer 130 serves to locate the point of contact between the spacer 130 and the disk 10 at a position which is on the radially inner side of the point of contact between the protrusion 21a and the disk 10, thereby ensuring generation of the counter bending moment $M_1'$. Thus, the fourth embodiment as described offers to further ensure prevention of warping of the disk 10, over the disk drive explained before in connection with FIG. 2.

Each of the foregoing embodiments of the disk drive employs three disks. This, however, is only illustrative and the disk drive may be constructed to support and drive many disks. In such a case, the construction of the disk drive is such that protrusions are formed not only on the hub flange 29 and the spacer 130 adjacent to the disk 10 but also on some spacers which are successively arranged on the upper side of the spacer 130, so as to prevent warping of not only the disk 10 adjacent to the hub flange 29 but also other disks which are successively arranged on the upper side of the disk 10. For instance, referring to FIG. 5, there may be seven disks disposed between the disk 11 and the disk 12. Thus, there are ten disks in total, with spacers disposed between adjacent disks, i.e., such that the disks and spacers appear alternately. A protrusion 21a is provided on the surface of the hub flange 29 facing the disk 10, while a protrusion 130a is formed on the surface of the spacer 130 facing the disk 10. Spacers down to a fourth one adjacent to the fifth disk as counted from the spacer 130 are provided with protrusions on their surfaces facing the disk 10 at positions which are on the radially inner side of the protrusion 21a of the hub flange 29. The remainder areas of these surfaces of the spacers down to the fourth one, as well as the entire areas of the opposite surfaces of these spacers, are flat, so that these disks make contact with the associated disks only at their protrusions.

When the clamp 32 is mounted on the hub 21, the pressing force from the hub 21 acts on the point of contact between the disk 10 and the spacer 130, tending to generate a bending moment $M_1$ which would cause a warp of the disk 10 such that the disk 10 is convexed towards the hub flange 29 or the bracket 22. According to the described arrangement, however, the protrusion 21a on the hub flange 29 serves to locate the point on which the pressing force from the hub 21 acts at a position which is on the radially outer side of the point of contact between the disk 10 and the spacer 130, thus generating a bending moment $M_1'$ which acts in the direction counter to that of the aforementioned bending moment $M_1$. At the same time, the protrusions provided on the spacers down to the fourth one serve to locate the points of contacts of these spacers with the associated disks at positions which are on the radially inner side of the point of contact between the protrusion 21a of the hub and the disk 10, so as to further ensure the generation of the counter moment $M_1'$, thereby preventing warping of the disks down to the fifth one as counted from the disk 11.

Figure 6:
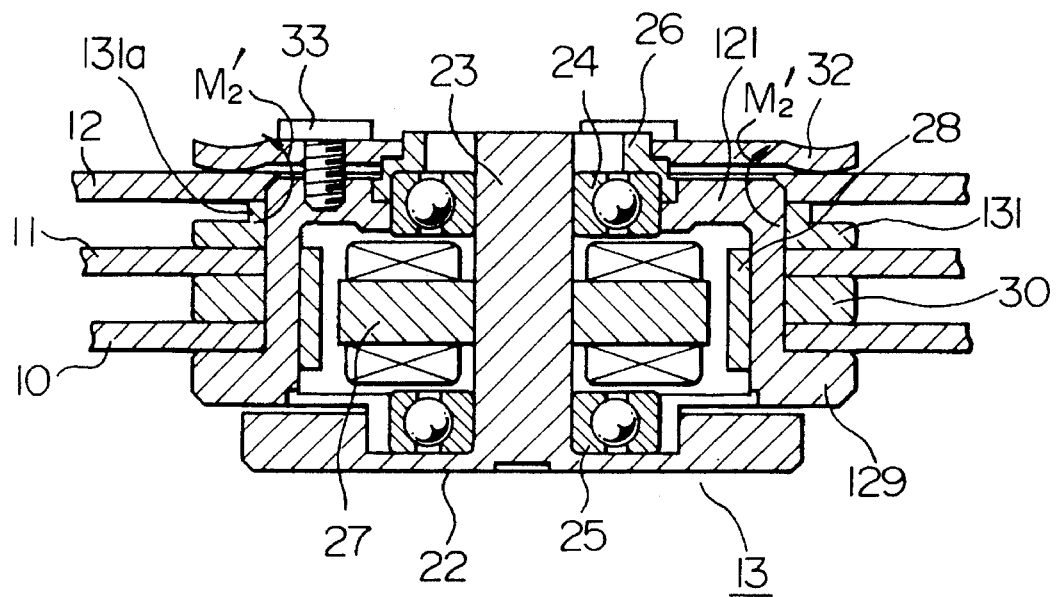
FIG. 6 is a sectional view of a fifth embodiment of the disk-type storage medium driving device in accordance with the present invention.

FIG. 6 illustrates a fifth embodiment of the disk drive of the present invention for use in magnetic-disk-type storage apparatuses. The disk drive of this embodiment has a construction similar to that of the first embodiment described before in connection with FIG. 2, but is different therefrom in that the hub denoted by 121 does not have any protrusion. Thus, in the fifth embodiment, only the spacer 131 is provided with a protrusion 131a, so as to prevent warping of the disk 12.

The hub 121 of the spindle motor used in this embodiment has a construction substantially the same as that of the spindle motor hub 21 used in the first embodiment shown in FIG. 2, except that the surface of the flange 129 facing the disk 10 is entirely flat without any protrusion. The spacer 131 adjacent to the disk 12 is provided on the surface thereof facing the disk 12 with a protrusion 131a. The remainder area of this surface of the spacer 131, as well as the entire area of the opposite surface of the same, is flat, so that the spacer 131 makes contact with the disk 12 only at the protrusion 131a. The protrusion 131a is formed on the surface of the spacer 131 facing the disk 12 at a position which is on the radially inner side of the protrusion on the clamp 32 contacting the disk 12.

In the fifth embodiment of the disk drive, when the clamp 32 is mounted on the hub 121, the hub 121 is opened by the pressure exerted by the clamp 32, and the pressing force transmitted from the hub 121 acts on the point of contact between the clamp 32 and the disk 12, tending to generate a moment $M_2$ about the point of contact between the clamp 32 and the spacer 131. The bending moment $M_2$ acts to cause a warp of the disk 12 such that the disk 12 is convexed towards the clamp 32. In this embodiment, however, such warp of the disk 12 is prevented because a counter moment $M_2'$ is generated to cancel the above-mentioned bending moment $M_2$ by virtue of the fact that the point of contact between the clamp 32 and the disk 12 is located on the radially outer side of the point of contact between the spacer 131 and the disk 12, due to the presence of the protrusion 131a on the spacer 131.

The disk drive shown in FIG. 6 also may be constructed to support and drive four or more disks. In such a case, not only the spacer 131 adjacent to the disk 12 but also plural spacers arranged between the spacer 131 and the hub 121 are provided with protrusions, so as to prevent warp of the disk 12 and other disks arranged towards the hub 121.

For instance, referring to FIG. 6, seven disks may be disposed between the disk 12 and the disk 11. Thus, ten disks in total are supported and driven by the disk drive of this embodiment. Spacers are disposed between adjacent disks such that the disks and the spacers appear alternately. In order to prevent warp of the disks down to the fifth one as counted from the disk 12, the spacer 131 is provided with the protrusion 131a on its surface facing the disk 12 and, at the same time, plural spacers down to the fourth one as counted from the spacer 131, associated with the disks down to fifth one as counted from the disk 12, are provided with protrusions similar to the protrusion 131a on their surfaces facing the disk 12. The remainder portions of these surfaces of the spacers down to the fifth one, as well as the opposite surfaces of these spacers, are flat so that these spacers contact with the associated disks only at their protrusions. When the hub 32 is mounted on the hub 121, a pressing force is exerted by the clamp 32 tending to produce a bending moment $M_2$ which would cause a warp of the disk 12 such that the disk 12 is convexed towards the clamp 32. In this embodiment, however, the point on which the pressing force from the clamp 32 acts is located at the radially outer side of the point of contact between the disk 12 and the spacer 131, by virtue of the provision of the protrusion 131a, so that a bending moment $M_2'$ is generated to act in the direction counter to the above-mentioned bending moment $M_2$. Thus, the protrusions on the spacers down to the fourth one as counted from the spacer 131 serve to locate the points of contacts between these spacers and the associated disks at the radially inner side of the point of contact between the clamp 32 and the disk 12 so as to ensure that the counter moment $M_2'$ is generated without fail, thereby preventing warping of the disks down to the fifth one.

Figure 7:
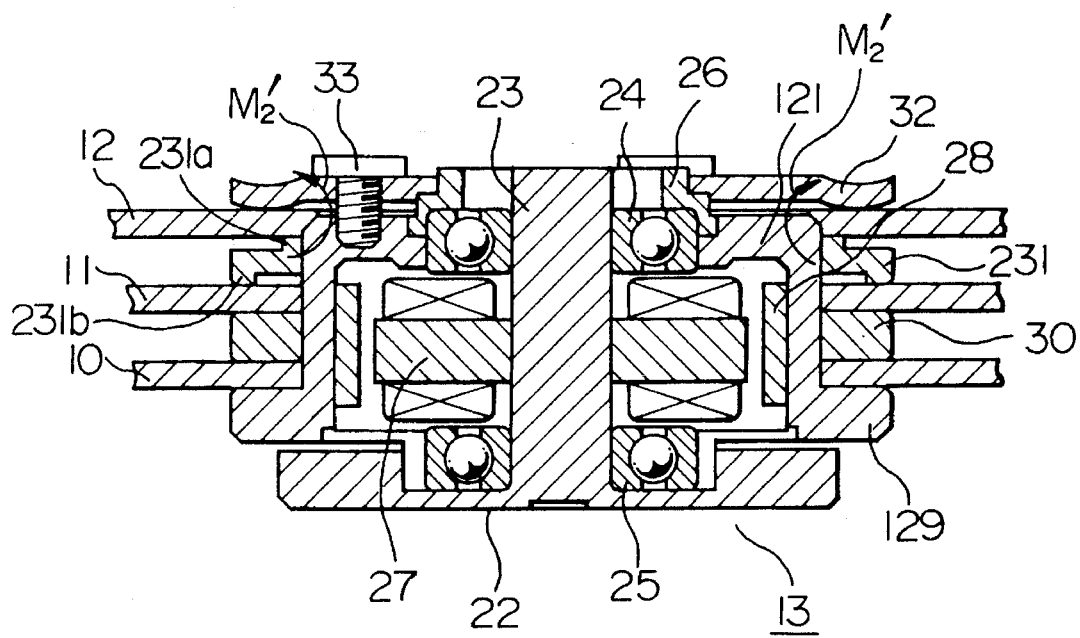
FIG. 7 is a sectional view of a sixth embodiment of the disk-type storage medium driving device in accordance with the present invention.

FIG. 7 illustrates a sixth embodiment of the disk drive of the present invention for use in magnetic-disk-type storage apparatuses. This disk drive has a construction substantially the same as that of the fifth embodiment shown in FIG. 6, but is different from the fifth embodiment in that a spacer 231 between the disk 12 and the disk 11 is provided with a second protrusion 231b on the surface thereof facing the disk 11, in addition to the first protrusion 231a formed on the surface thereof facing the disk 12. The second protrusion 231b serves to ensure that the counter moment $M_2$ is effectively generated to resist the bending moment $M_2$ which acts to cause a warp of the disk 12 such that the disk is convexed towards the clamp 32.

Figure 8:
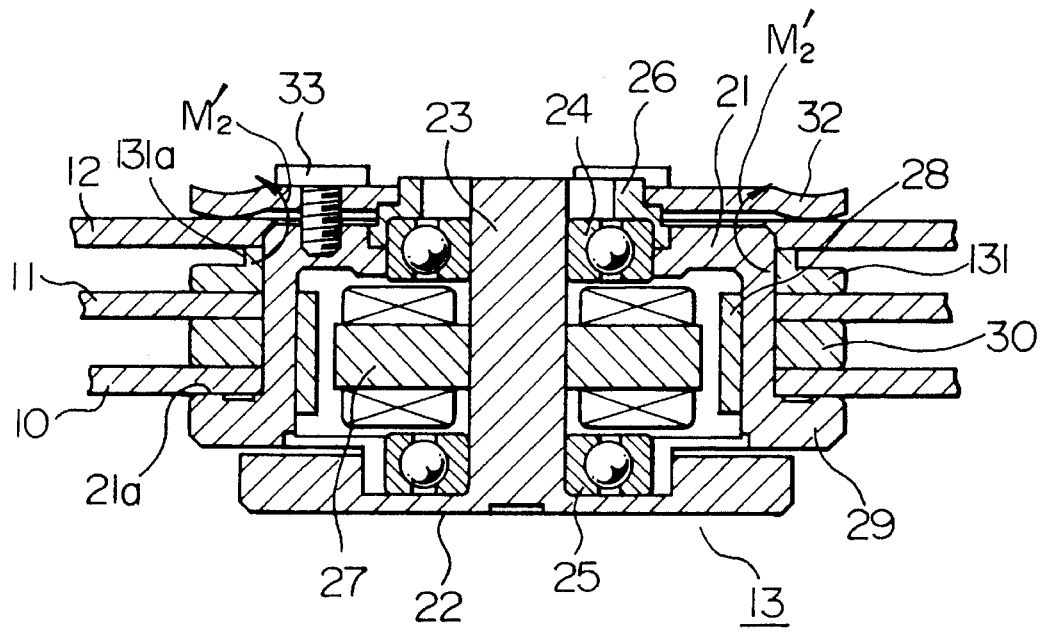
FIG. 8 is a sectional view of a seventh embodiment of the disk-type storage medium driving device in accordance with the present invention.

FIG. 8 shows a seventh embodiment of the disk drive in accordance with the present invention for use in magnetic-disk-type storage apparatuses. This disk drive has a construction similar to that of the first embodiment described before in connection with FIG. 2 but is different therefrom in that not only the hub 21 but also the spacer 131 is provided with a protrusion 131a so that the disks 10 and 12 are prevented from being warped.

Referring to FIG. 8, a hub 21 is provided on the surface of the flange 29 facing the disk 10 with a protrusion 21a. The remainder portion of this surface of the flange 29 is flat so that the flange 29 makes contact with the disk 10 only at the protrusion 21a thereof. The spacer 131 is provided with the above-mentioned protrusion 131a on the surface thereof facing the disk 12. The remainder portion of this surface, as well as the entire area of the opposite surface, of the spacer 131 is flat, so that the spacer 131 makes contact with the disk 12 only at the protrusion 131a thereof. More specifically, the protrusion 21a on the hub flange 29 is disposed on the above-mentioned surface of the flange 29 at the radially outer side of the point of contact between the hub flange 29 and the disk 10 which takes place when the clamp 32 is mounted on the hub 21, while the protrusion 131a is provided on the surface of the spacer 131 facing the disk 12 at a position which is on the radially inner side of the point of contact between the clamp 32 and the disk 12 which takes place when the clamp 32 is mounted on the hub 21.

The operation of the disk drive shown in FIG. 8 is similar to that of the first embodiment of the disk drive explained before in connection with FIG. 2. Namely, as the clamp 32 is mounted on the hub 21, the pressing force exerted by the hub 21 acts on the point of contact between the disk 10 and the spacer 30, tending to generate a bending moment $M_1$ which would cause a warp of the disk 10 such that the disk 10 is convexed towards the hub flange 29 or the bracket 22. In the embodiment, however, the pressing force from the hub 21 acts on a point which is on the radially outer side of the point of contact between the disk 10 and the spacer 30 due to the presence of the protrusion 21a on the flange 29, so as to generate a counter moment $M_1'$ which acts in the direction counter to the above-mentioned bending moment $M_1$, whereby the disk 10 is maintained in flat condition. At the same time, the protrusion 131a on the spacer 131 serves to locate the point of contact between the clamp 32 and the disk 12 at a position on the radially outer side of the point of contact between the disk 12 and the spacer 131. Thus, the pressing force exerted by the hub 21 acts on a point which is on the radially inner side of the point of contact between the disk 12 and the clamp 32, so that a counter moment $M_2'$ is generated to resist the bending moment $M_2$, whereby the disk 12 also is maintained in a flat condition. Consequently, the disk 11 which is disposed between these disks 10 and 12 also is maintained flat.

Figure 9:
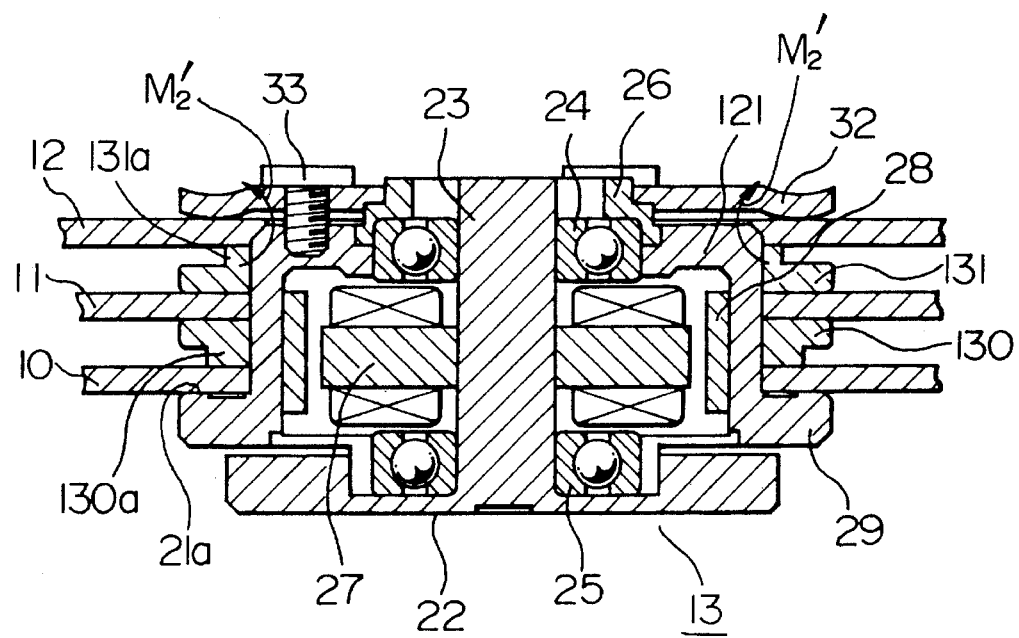
FIG. 9 is a sectional view of an eighth embodiment of the disk-type storage medium driving device in accordance with the present invention.

FIG. 9 shows an eighth embodiment of the disk drive of the invention for use in magnetic-disk-type storage apparatuses. This disk drive has a construction substantially the same as that explained before in connection with FIG. 8, but is different from the device of FIG. 8 in that not only the hub flange 29 and the spacer 131 but also the spacer 130 facing the hub flange 29 is provided with a protrusion 130a, thereby enhancing the effect to keep the disks 10 to 12 flat.

More specifically, the hub 21 is provided with a protrusion 21a provided on the surface thereof facing the disk 10. The remainder portion of this surface of the flange 29 is flat so that the hub 21 makes contact with the disk 10 only at the protrusion 21a thereof. The spacer 130 is provided with a protrusion 130a on the surface thereof facing the disk 10. The remainder portion of this surface of the spacer 130, as well as the entire area of the opposite surface, is flat so that the spacer 130 makes contact with the disk 10 only at the protrusion 130a. The spacer 131 is provided with a protrusion 131a on the surface thereof facing the disk 12. The remainder portion of this surface of the spacer 131, as well as the entire area of the opposite surface of the same, is flat so that the spacer 131 makes contact with the disk 10 only at the protrusion 131a. More specifically, the protrusion 21a is formed on the above-mentioned surface of the hub flange 29 at a location which is on the radially outer side of the point of contact between the disk 10 and the clamp 130 which takes place when the clamp 32 is mounted on the hub 21. The protrusion 130a is disposed at a position which is at the radially inner side of the protrusion 21a on the hub flange 29, while the protrusion 131a is disposed at a position which is at the radially inner side of the point of contact between the clamp 32 and the disk 12 which takes place when the clamp 32 is mounted on the hub 21.

The operation of the eighth embodiment, having the hub 21 and the spacers 130, 131 with the above-descried features, will now be described. As in the case of the disk drive of the first embodiment described before in connection with FIG. 2, when the clamp 32 is mounted on the hub 21, the pressing force from the hub 21 is applied to the point of contact between the disk 10 and the spacer 130, generating a bending moment $M_1$ which tends to cause a warp of the disk 10 such as to convex the disk 10 towards the hub flange 29 or the bracket 22. Meanwhile, the protrusion 21a on the hub flange 29 serves to locate the point of action of the pressing force from the hub 21 at a position which is at the radially outer side of the point of contact between the disk 10 and the spacer 130, thereby generating a bending moment $M_1'$ which acts in the direction counter to the bending moment $M_1$. At the same time, the protrusion 130a on the spacer 130 serves to locate the point of contact between the spacer 130 and the disk 10 always at the radially inner side of the point of contact between the protrusion 21a and the disk 10, so as to ensure that the counter moment $M_1'$ is generated, thereby maintaining the disk 10 flat. In addition, the protrusion 131a of the spacer 131 serves to locate the point of contact between the clamp 32 and the disk 12 at the radially outer side of the point of contact between the disk 12 and the spacer 131, thus causing the pressing force of the hub 21 to act on a point which is at the radially inner side of the point of contact between the disk 12 and the clamp 32, thereby generating a moment $M_2'$ which acts in the direction counter to the bending moment $M_2$, thereby further ensuring that all the disks 10 to 12 are maintained flat without any warp. It is therefore possible to prevent warping of the disks even when a large number of disks with reduced thickness are employed to increase the storage capacity and even when the hub 21 supporting such many disks is of a reduced weight.

Figure 10:
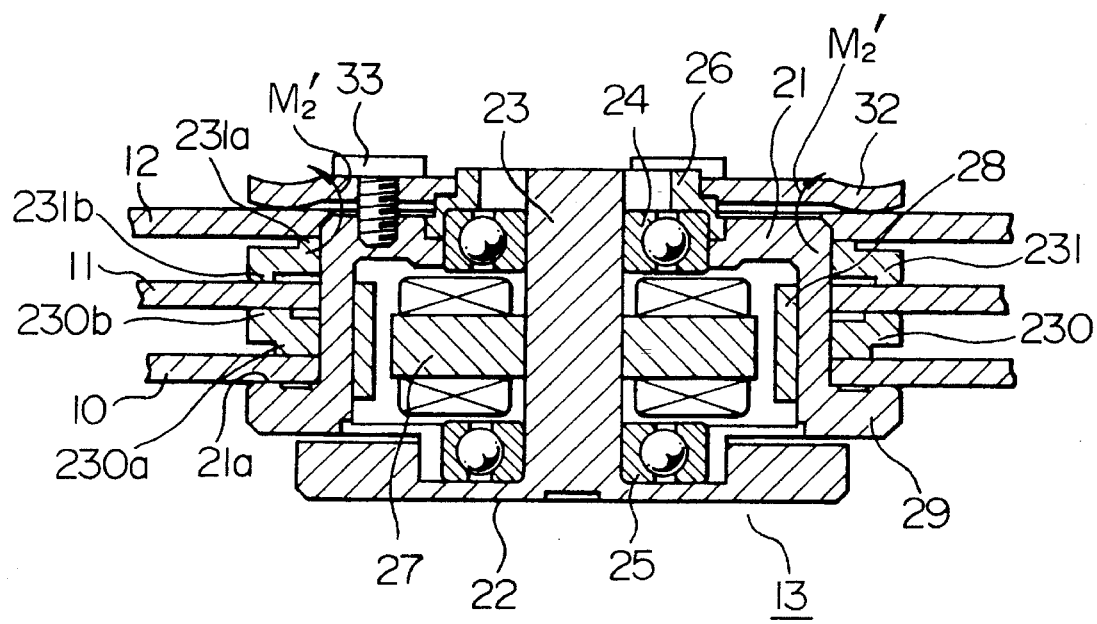
FIG. 10 is a sectional view of a ninth embodiment of the disk-type storage medium driving device in accordance with the present invention.
Figure 11:
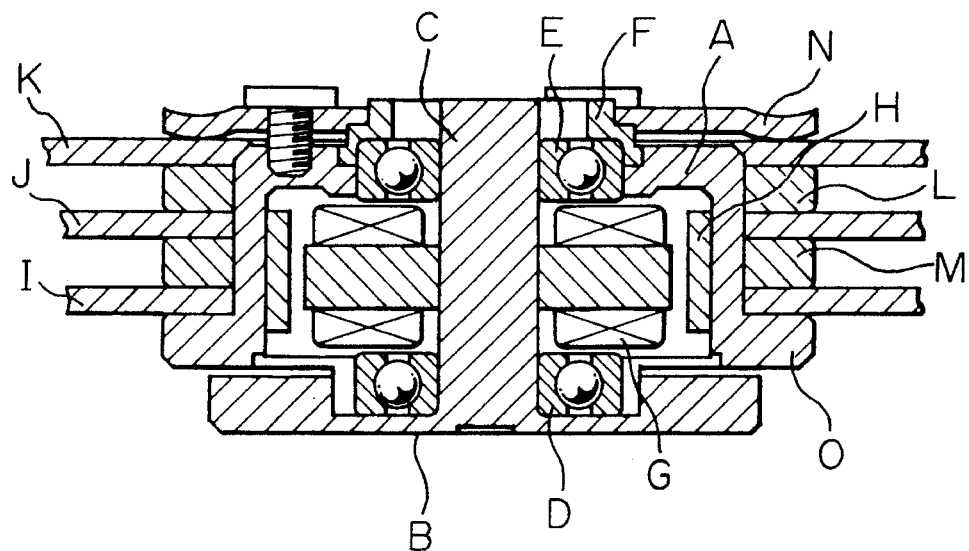
FIG. 11 is a sectional view of a known disk-type storage medium driving device.

FIG. 10 illustrates a ninth embodiment of the disk drive of the present invention for use in magnetic-disk-type storage apparatuses. This disk drive has a construction substantially the same as that of the eighth embodiment shown in FIG. 9. The ninth embodiment, however, is different from the eighth embodiment in that the spacer 231 between the disk 12 and the disk 11 is provided with a second protrusion 231b on the surface thereof facing the disk 11 in addition to the first protrusion 231a which is provided on the surface thereof facing the disk 12, and in that the spacer 230 disposed between the disk 10 and the disk 11 is provided with a second protrusion 230b on the surface thereof facing the disk 11 in addition to the first protrusion 230a provided on the surface thereof facing the disk 10. The second protrusion 230b of the spacer 230 serves to effectively produce a counter moment $M_1'$ acting in the direction counter to the bending moment $M_1$ which tends to cause warping of the disk 10 such that the disk 10 is convexed towards the hub flange 29. At the same time, the second protrusion 231b of the spacer 231 enables more effective generation of the counter moment $M_2'$ acting in the direction counter to the bending moment $M_2$ which tends to convex the disk 12 towards the clamp 32.

In each of the disk drives of the present invention described hereinbefore, all the disks 10 to 12 are maintained flat without substantial warp, thus maintaining a constant size of the gap between each disk and the associated head regardless of the position in the disk. Consequently, all the heads produce the same level of read-out voltage even when the amount of lift of the head or slider is small, thus enhancing the density of recording. It is therefore possible to obtain a magnetic-disk-type storage apparatus which is compact in construction but yet having a large storage capacity.

The present invention can also be applied to a disk drive apparatus which supports and drives only one disk. In such an application, warping of the sole disk can be prevented by providing a protrusion on the hub. The disk drive in this case has a construction which is similar to that shown in FIG. 2 but is devoid of the disks other than the disk 10. Namely, the disk drive includes a disk 10 as a sole disk, a hub 21 disposed on one side of the disk 10 and having a surface contacting the disk 10, and a clamp 32 which presses the disk 10 against the above-mentioned surface of the hub 21. The hub 21 is provided with a protrusion 21a on its surface facing the disk 10.

When the clamp 32 is mounted on the rotor hub 26, the hub 21 is opened by the pressing force exerted by the clamp 32, so that the point of contact between the hub 21 and the disk 10 is located at the radially outer side of the point of contact between the disk 10 and the clamp 32, so that a bending moment $M_2$ is generated about the point of contact between the disk 10 and the clamp 32 so as to cause a warp of the disk 10 such that the disk 10 is convexed towards the hub 32. However, according to the invention, the protrusion 21a on the hub 21 is located at the radially outer side of the point of contact between the disk 10 and the clamp 32, so that a counter moment $M_2'$ is generated to act in the direction counter to the bending moment $M_2$ about the point contact between the disk 10 and the clamp 32, thereby preventing warping of the disk 10.

As will be understood from the foregoing description, according to the present invention, it is possible to eliminate any warp of disks or, if not, reduce the warp to an extremely small degree. The disk drive in accordance with the present invention, therefore, allows the gaps between the heads and the disks to be reduced sufficiently to enhance the density of recording when employed in a magnetic-disk-type storage apparatus, thus making it possible to obtain a magnetic-disk-type recording apparatus having increased storage capacity. Moreover, such remarkable effect can be achieved without using spacers which exhibit large change in dimensions according to conditions of use, e.g., spacers made of an elastic material, thus ensuring stable operation of the disk drive.

What is claimed is:

1. A device for driving disk-type storage media, comprising:

plurality of disk-type storage media;

spacers placed between respective two adjacent disk-type storage media;

a shaft;

a hub mounted on said shaft on which a stack of said disk-type storage media and said spacers is fitted, said hub having a surface contacted by the disk-type storage medium which provides one end of the stack; and a clamp placed in contact with a top surface of a disk-type storage medium on another end of said stack, said clamp pressing the stack onto said surface of said hub;

wherein said hub has a protrusion provided on said surface of said hub at a position with respect to said shaft which is radially outside of a region where the disk-type storage medium adjacent to said hub contacts said spacer adjacent thereto when said clamp is mounted on said hub, and wherein the spacer adjacent to said disk-type storage medium adjacent to said hub has a protrusion formed on the surface thereof facing said disk-type storage medium at a position with respect to said shaft which is radially inside of a region where said disk-shaped storage medium contacts said hub when said clamp is mounted and said contacted surface of said hub is radially outside of a region of contact of said clamp and said top surface.

2. The device of claim 1 wherein a moment caused by the position relationship of the contact of said hub and said clamp opposes a warping moment created by application of said clamp.

3. A device for driving disk-type storage media, comprising:

a plurality of disk-type storage media;

spacers placed between respective two adjacent disk-type storage media;

a shaft;

a hub mounted on said shaft, on which a stack of said disk-type storage media and said spacers is fitted, said hub having a surface contacted by the disk-type storage medium positioned on one end of the stack; and a clamp placed in contact with a top surface of a disk-type storage medium on another end of said stack, said clamp pressing the stack onto said surface of said hub;

wherein said hub has a protrusion provided on said surface thereof at a position with respect to said shaft which is radially outside of a region where the disk-type storage medium adjacent to said hub contacts said spacer adjacent thereto when said clamp is mounted, and wherein each of plural spacers arranged successively starting from the spacer adjacent to said hub is provided with a protrusion on the surface thereof facing the disk-type storage medium adjacent to said hub at a position with respect to said shaft which is radially inside of said protrusion on said hub and said contacted surface of said hub is radially outside of a region of contact of said clamp and said top surface.

4. The device of claim 3 wherein a moment caused by the position relationship of the contact of said hub and said clamp opposes a warping moment created by application of said clamp.

5. A device for driving disk-type storage media, comprising:

a plurality of disk-type storage media;

a spacer placed between respective two adjacent disk-type storage media;

a shaft;

a hub, mounted on said shaft, on which a stack of said disk-type storage media and said spacer is fired, said hub having a surface contacted by the disk-type storage medium positioned on one end of the stack; and a clamp placed in contact with a top surface of a disk-type storage medium on another end of said stack, said clamp pressing the stack onto said surface of said hub;

wherein said hub has a protrusion provided on said surface thereof at a position with respect to said shaft which is radially outside of a region where the disk-type storage medium adjacent to said hub contacts said spacer adjacent thereto when said clamp is mounted on said hub, and wherein the spacer adjacent to said disk-type storage medium adjacent to said clamp has a protrusion on the surface thereof facing the disk-type storage medium adjacent to said hub at a position with respect to said shaft which is radially inside of a region where said clamp contacts the disk-type storage medium adjacent thereto when said clamp is mounted and said contacted surface of said hub is radially outside of said region of contact of said clamp and said top surface.

6. The device of claim 5 wherein a moment caused by the position relationship of the contact of said hub and said clamp opposes a warping moment created by application of said clamp.

7. A device for driving disk-type storage media, comprising:

a plurality of disk-type storage media;

spacers placed between respective two adjacent disk-type storage media;

a shaft;

a hub, mounted on said shaft on which a stack of said disk-type storage media and said spacers is fitted, said hub having a surface contacted by the disk-type storage medium positioned on one end of the stack; and a clamp placed in contact with a top surface of a disk-type storage medium on another end of said stack, said clamp pressing the stack onto said surface of said hub;

wherein said hub has a protrusion provided on said surface thereof at a position with respect to said shaft which is radially outside of a region where the disk-type storage medium adjacent to said hub contacts said spacer adjacent thereto when said clamp is mounted on said hub, wherein the spacer adjacent to said disk-type storage medium adjacent to said hub has a protrusion formed on the surface thereof facing said disk-type storage medium at a position with respect to said shaft which is radially inside of said region where said disk-shaped storage medium contacts said hub when said clamp is mounted, and wherein the spacer adjacent to the disk-type storage medium adjacent to said clamp has a protrusion on the surface thereof facing said disk-shaped storage medium adjacent to said clamp at a position with respect to said shaft which is radially inside of a region where said clamp contacts said disk-type storage medium adjacent thereto when said clamp is mounted and said contacted surface of said hub is radially outside of said region of contact of said clamp and said top surface.

8. A device according to claim 7, wherein said spacer adjacent to said disk-type storage medium adjacent to said hub further has a protrusion on the surface thereof opposite to said surface at a position with respect to said shaft which is radially outside of said region where said hub contacts said disk-type storage medium adjacent thereto when said clamp is mounted, and wherein the disk-type storage medium adjacent to said clamp further has a protrusion on the surface thereof opposite to said surface at a position with respect to said shaft which is radially outside of said region where said clamp contacts said disk-type storage medium adjacent thereto when said clamp is mounted.

* * * * *

UNITED STATES PATENT AND TRADEMARK OFFICE
CERTIFICATE OF CORRECTION

PATENT NO. : 5,504,638
DATED : April 2, 1996
INVENTOR(S) : Yoshihiko KINOSHITA et al.

It is certified that error appears in the above-indentified patent and that said Letters Patent is hereby corrected as shown below:

| Column | Line | |
|---|---|---|
| 1 | 30 | Change "gigabytes." to --gigabyte.--. |
| 1 | 66 | Change "whole" to --all--. |
| 4 | 61 | Before "plural" delete "a". |
| 7 | 60 | Change "$M_1$," to --$M_1'$--. |
| 9 | 5 | Change "$M_1$" to --$M_1'$--. |
| 13 | 35 | Change "such many" to --so many--. |
| 14 | 28 | After "point" insert --of--. |
| 15 | 51 | Change "fired," to --fitted,--. |

Signed and Sealed this

First Day of October, 1996

Attest:

BRUCE LEHMAN

Attesting Officer     Commissioner of Patents and Trademarks